(12) United States Patent
Holzwarth et al.

(10) Patent No.: US 7,418,017 B2
(45) Date of Patent: Aug. 26, 2008

(54) INTERFEROMETER, IN PARTICULAR FOR DETERMINING AND STABILIZING THE RELATIVE PHASE OF SHORT PULSES

(75) Inventors: Ronald Holzwarth, Munich (DE); Michael Mei, Munich (DE)

(73) Assignee: Menlo Systems GmbH, Martinsried (DE)

( * ) Notice: Subject to any disclaimer, the term of this patent is extended or adjusted under 35 U.S.C. 154(b) by 59 days.

(21) Appl. No.: 11/492,248

(22) Filed: Jul. 25, 2006

(65) Prior Publication Data

US 2007/0071060 A1    Mar. 29, 2007

(30) Foreign Application Priority Data

Jul. 27, 2005   (DE)   .................. 10 2005 035 173

(51) Int. Cl.
  *H01S 3/13*   (2006.01)
(52) U.S. Cl. .............................. 372/29.023; 372/29.02; 372/30
(58) Field of Classification Search ................ 372/22, 372/29.02, 29.023–30
  See application file for complete search history.

(56) References Cited

U.S. PATENT DOCUMENTS

| | | | | |
|---|---|---|---|---|
| 4,681,449 | A * | 7/1987 | Bloom et al. ................ 356/364 |
| 6,658,034 | B2 * | 12/2003 | Garnache et al. ....... 372/45.013 |
| 6,785,303 | B1 | 8/2004 | Holzwarth | |
| 6,944,204 | B2 * | 9/2005 | Zhou et al. .................. 372/109 |
| 2004/0017833 | A1 * | 1/2004 | Cundiff et al. ................ 372/18 |

FOREIGN PATENT DOCUMENTS

EP    1 161 782 B1    10/2002

OTHER PUBLICATIONS

Kakehata, Masayuki, et al., "Single-shot measurement of carrier-envelope phase changes by spectral interferometry," *Optics Letters*, vol. 26, No. 18, pp. 1436-1438, Sep. 2001.
Udem, Th., et al., "Optical frequency metrology," Insight Review Articles, *Nature*, vol. 416, pp. 233-237, Mar. 2002.
Baltuška, A., et al., "Controlling the Carrier-Envelope Phase of Ultrashort Light Pulses with Optical Parametric Amplifiers," *Physical Review Letters*, vol. 88, No. 13, pp. 133901-1-133901-4, Apr. 2002.
Baltuška, A., et al., "Attosecond control of electronic processes by intense light fields," Letters to Nature, *Nature*, vol. 421, pp. 611-615, Feb. 2003.

* cited by examiner

*Primary Examiner*—Minsun Harvey
*Assistant Examiner*—Phillip Nguyen
(74) *Attorney, Agent, or Firm*—Schnader Harrison Segal & Lewis LLP

(57) ABSTRACT

A description is given of an optical structure (100), in particular for determining and stabilizing the relative phase of short pulses, which contains a broadening device (6) for broadening the frequency spectrum of pulses of electromagnetic radiation, and a frequency multiplier device (8) for multiplying at least one frequency component of the pulses, wherein a focusing lens optic (7) is arranged between the broadening device and the frequency multiplier device, which focusing lens optic can be used to focus the pulses into the frequency multiplier device (8). Uses of this optical structure are also described.

6 Claims, 5 Drawing Sheets

INTERFEROMETER, IN PARTICULAR FOR DETERMINING AND STABILIZING THE RELATIVE PHASE OF SHORT PULSES

This application is based on, and claims priority to, German patent application, serial number 10 2005 035 173.5, having a filing date of Jul. 27, 2005, and entitled Interferometer, insbesondere für die Bestimmung und Stabilisierung der relativen Phase kurzer Pulse.

SUBJECT OF THE INVENTION

The invention relates to an optical set-up for handling pulses of electromagnetic radiation, and in particular to a compact interferometer, for example for determining and stabilizing the relative phase of short pulses. The invention also relates to methods for handling pulses of electromagnetic radiation, in particular laser pulses.

PRIOR ART

Mode-coupled short-pulse lasers emit a periodic pulse train. In order to visualize the important processes which occur therein, the idealized case of a short pulse which circulates in a laser resonator with the length L and with the carrier frequency $\omega_c$ will be considered first. This is shown in FIG. 1. Each time the pulse occurs on the output coupler of the laser resonator, a copy of the pulse is output. The output pulses are separated from one another in time terms by the cycle time of the pulses in the resonator $T=v_g/2L$, wherein $v_g$ is the average group velocity in the resonator and L is the length of the (linear) resonator. However, the output pulses are not identical. The envelope of a pulse moves at the group velocity $v_g$, whereas on the other hand the electric carrier field on which it is based moves at its phase velocity. As a result, the phase between the envelope and the electric field is shifted by $\Delta\phi$ from pulse to pulse, as shown in FIG. 1. The envelope itself is periodic, i.e. $A(t)=A(t-T)$, whereas the electric field on the other hand is not. The electric field can be expressed accordingly as $$E(t)=Re(A(t)\exp(-i\omega_c t))=Re(\Sigma_n A_n \exp(-i(\omega_c+n\omega_r)t)) \quad (1)$$

Here, $A_n$ are the Fourier components of $A(t)$. Under the prerequisite of a periodic envelope, the resulting spectrum can therefore be described as a comb of laser modes, separated by the pulse repetition rate. Since $\omega_c$ is not necessarily a multiple of $\omega_r$, the modes are obviously shifted with respect to the precise harmonic of the pulse repetition rate, and the following applies:

$$\omega_n = n\omega_r + \omega_o \quad (2)$$

with a large ($\approx 10^6$) even number n. This equation shows two radio frequencies $\omega_r$ and $\omega_o$ on the optical frequency $\omega_n$. This can be used for optical frequency metrology and is described for example in EP 1 161 782 and in "Nature", vol. 416, 2002, page 233.

For many practical applications, the offset frequency of the frequency comb has to be stabilized. In order to detect the offset frequency, use is made for example of a structure as shown in FIG. 2. If the spectrum covers an entire optical octave, it contains two modes with the mode numbers n and 2n. If the mode with the mode number n has its frequency doubled and is made to beat with the mode 2n, then according to equation 2 the desired frequency is obtained $$\omega_o = 2(n\omega_r+\omega_o)-(2n\omega_r+\omega_o).$$

In practice, the high peak intensity can be used to double in a very efficient manner a large number of modes in the vicinity of n, in order then to make them beat with an equal number of modes in the vicinity of 2n. If the propagation times of the pulses are selected correctly, all the beat signals are constructively superposed on one another and thus amplify the signal again. The signal obtained in this way can then be stabilized to a predefined frequency or to zero. If the offset frequency is stabilized to zero, each pulse has an identical appearance. If the offset frequency is stabilized to ¼ of the repetition rate, each 4th pulse is identical.

This in turn is important for high-grade non-linear processes. Processes in which the electric field occurs at a high power, such as for example the generation of high harmonics or "above threshold ionization" react sensitively to whether the electric field has or has not reached its maximum below the envelope, that is to say whether the pulse in question is a sine or cosine pulse. This is illustrated in FIG. 3. FIG. 3 shows the calculated intensity at 3.2 nm and the generated intensity in the case of a sine and a cosine pulse. For the cosine pulse, the electric field reaches its maximum below the envelope.

In order to be able to observe such processes, it is important that all the pulses are identical, that is to say have the same phase difference between the envelope and the electric field. Moreover, for such effects, usually a very high pulse energy of a few μJ to several mJ is necessary, and this requires further amplification of the pulses. Such a high-power system is shown in FIG. 4.

The starting point of the system is a phase-stabilized 10 fs laser system. This consists of a Ti:sapphire fs laser (Femtosource Compact Pro, Femtolasers) which is mode-coupled via the Kerr effect and uses special "chirped" mirrors for dispersion compensation, and of a phase stabilization device (XPS 800 unit, MenloSystems GmbH). This phase stabilization device uses an f:2f interferometer (interferometer I in FIG. 4) and phase lock electronics. These phase lock electronics in turn control the acousto-optical modulator (AOM in FIG. 4) via a suitable driver. Around 50% of the output power of the fs laser is coupled into a photonic crystal fiber in order to generate a spectrum having a width of one octave. Further details are described in the handbook for the XPS 800 phase stabilization device. In the text which follows, the long-wave part $f_{low}$ of the broadened spectrum has its frequency doubled in order to be able to observe a beat signal with the short-wave part of the broadened comb whereby $f_{high}=2f_{low}$. The optical set-up for this will be referred to below as an f:f2 interferometer. The phase of the 2 interfering quasi-monochromatic wave packets differs by $2\phi-\phi+\Phi$, wherein $\Phi$ is an unknown constant phase, which prevents it from being possible for an absolute measurement to be carried out with such an arrangement $\phi$. Although the absolute position of the phase $\phi$ between the envelope and the carrier wave is unknown, the change in the information obtained here can be used to stabilize it. The output pulses then all have the same phase position, even though said phase position is unknown. The f:2f beat signal $f_o=\Delta\phi f_r/2\pi$ is observed at around 530 nm and then is fed to a digital phase detector which carries out a comparison with a reference which is generated by dividing the pulse repetition frequency by a factor of 4. The stabilization loop forces the two signals, that is to say ¼ $f_r$ and $f_o$ to oscillate in phase. The following is thus obtained for the pulse-to-pulse phase shift: $\Delta\phi=¼ 2\pi$, that is to say that each 4th pulse is identical.

The coarse adjustment of $\Delta\phi$ is achieved by adjusting the optical path length by a quartz wedge within the laser resonator. More or less glass is therefore introduced into the resonator. Close to the desired value, that is to say at around 20 MHz in the case of a repetition frequency of 80 MHz, the electronic control is switched on. To this end, a fine adjustment of Δφ is carried out via the non-linear effects in the laser crystal. For this purpose, the pump power of the fs laser is adjusted accordingly by means of an acousto-optical intensity modulator.

As a result, each 4th pulse in the 80 MHz pulse train is identical. If each 80,000th pulse is then selected via a pulse picker, each of these pulses has the same phase position. These selected pulses are then amplified in the multipass amplifier.

Unfortunately, the phase does not remain constant in the amplifier but rather drifts due to instabilities. In order to be able to stabilize the phase, which now changes more slowly, use is made of a further f:2f interferometer ("interferometer II" in FIG. 4). Due to the low pulse repetition rate and the fact that the phase changes only slowly, the spectral interference is observed here and is evaluated on a computer by means of Fourier transform algorithms. Due to the high pulse power, in order to generate the spectral interference it is sufficient here to focus the pulses into a sapphire plate. The white light that is generated is collimated by means of a curved mirror and again focused into a crystal in order to double the frequency. The error signal resulting from the evaluation of the spectral interference is added to the initial offset of the PI control loop in the 1st (fast) interferometer and can then adjust the phase, once again via the AOM.

If, in the case of short pulses, the offset frequency is low, that is to say for example is only a few Hertz or even mHz (as in the above case based on an amplifier system), an interference pattern with a certain modulation frequency can be observed on a commercially available spectrometer. The interference bands then run through the image at the offset frequency. If the offset frequency is low enough and the spectrometer is fast enough, it is thus possible to follow the movement of these interference bands.

It is often desirable to make the offset frequency equal to zero. In this case, the pulses are referred to as phase-stable pulses. To this end, a control system is introduced which keeps the position of the interference bands constant.

The apparatus described here is described in detail in "Nature", vol. 421, 2003, page 614 ("Attosecond control of electronic processes by intense light fields"). With regard to the properties and technical function of this apparatus, this publication is introduced into the present specification by reference. Spectral interference known in the art is also described in M. Kakehata et al., Opt. Lett. 26, 1436 (2001) and A. Baltuska et al., PRL 88, 133901 (2002).

One disadvantage of the conventional optical set-up is in particular the fact that the white light is collimated by means of curved mirrors. The mirrors require a high level of complexity in terms of adjustment and give rise to an astigmatism error.

OBJECTIVE OF THE INVENTION

The objective of the invention is to provide an improved optical structure, in particular an improved interferometer, by means of which the disadvantages of the prior art can be overcome. The objective of the invention is also to provide a correspondingly improved optical method, in particular a method for superposing frequency components of short pulses (interferometric superposition).

SUMMARY OF THE INVENTION

This objective is solved by an optical set-up, in particular an interferometer, which—unlike the conventional interferometer (as described above)—exhibits direct imaging of a white light focus into a frequency multiplier device (in particular a frequency doubling crystal) by means of a lens optic.

In particular, the frequency doubling crystal may be a periodically poled crystal, for example consisting of KTP.

The optical structure (one embodiment is shown in FIG. 5) has the following advantages:

Use is no longer made of curved mirrors, and as a result astigmatism is avoided and losses are minimized.

By imaging the white light focus by means of a lens into the frequency doubling crystal, a saving can be made with regard to further optics and adjustment complexity and the device can be of very compact design.

The light is guided "in line", that is to say continuously on the optical axis. As a result, complex holding of the crystals and complicated adjustment are avoided.

The device can be set up by means of simple rails or an optical bench system.

By means of the thickness of the lens, the spatial modulation frequency (that is to say the distance between the interference bands) can be adjusted without changing any other system parameters or introducing additional elements.

By virtue of the periodically poled crystal, it is possible to prevent "walk off" as occurs in a volume crystal. This is particularly advantageous for an "in line" arrangement of the elements.

The invention also relates to a phase stabilization device for pulses, which is equipped with the optical set-up, to a laser device which is equipped with the phase stabilization device, and to an optical method for imaging pulses in an optical structure for the interferometric superposition of pulse frequency components.

BRIEF DESCRIPTION OF THE DRAWINGS

Preferred features and embodiments of the invention are described in the following with reference to the attached drawings, which show in.

PREFERRED EMBODIMENT

Figure 1:
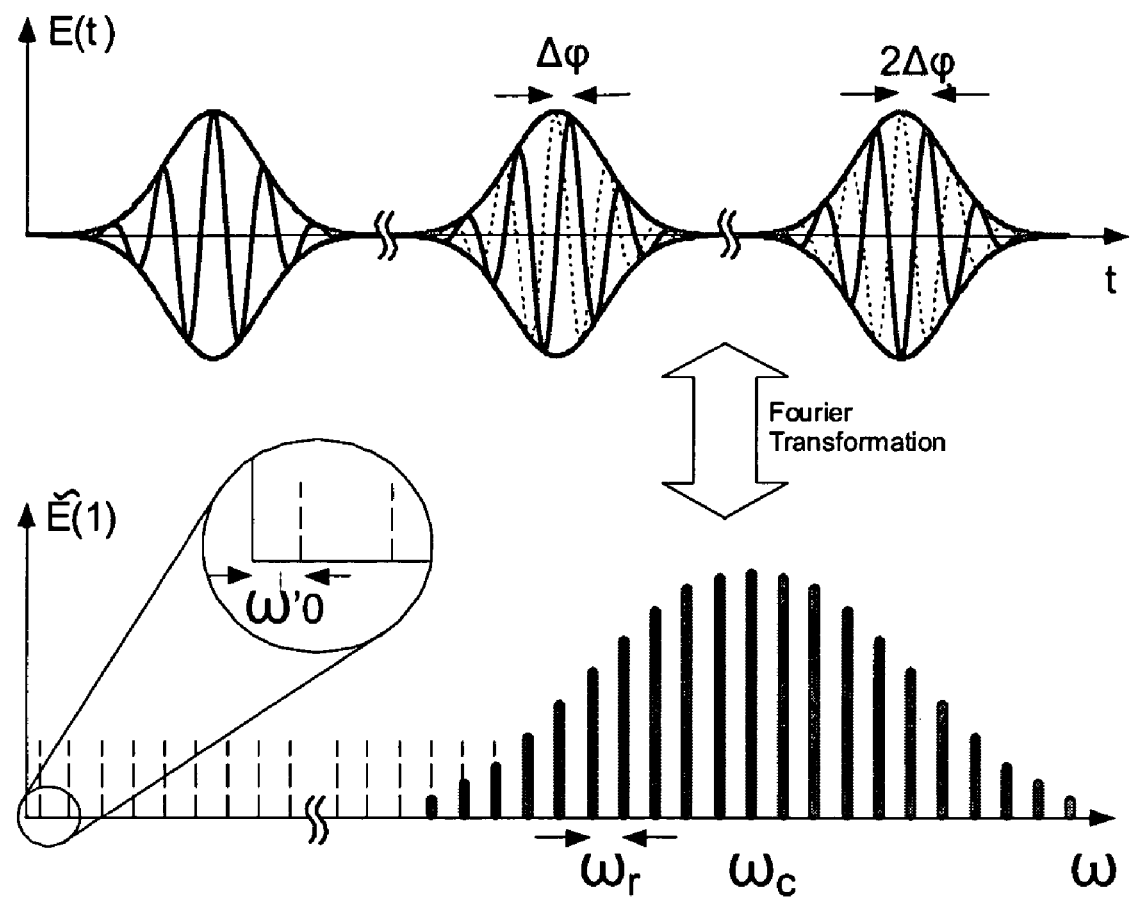
FIG. 1: a graphical illustration of a circulation of a very short pulse in a laser resonator with dispersion.

FIG. 1 illustrates a circulation of a very short pulse in a laser resonator with dispersion. While the envelope moves at the group velocity $v_g=d\omega/dk$, the carrier phase runs at the phase velocity $v_p=\omega/k$, so that, after each cycle, the relative phase between the carrier wave and the envelope increases by an angle Δφ. The spectrum shown in the lower part is obtained through Fourier transformation of the strictly periodic envelope. This spectrum consists of modes spaced apart by the pulse repetition rate $\omega_r$, which are shifted by $\omega_o=\Delta\phi/T$ from the harmonic of $\omega_r$, wherein $T=2\pi/\omega_r$ represents the pulse cycle time.

Figure 2:
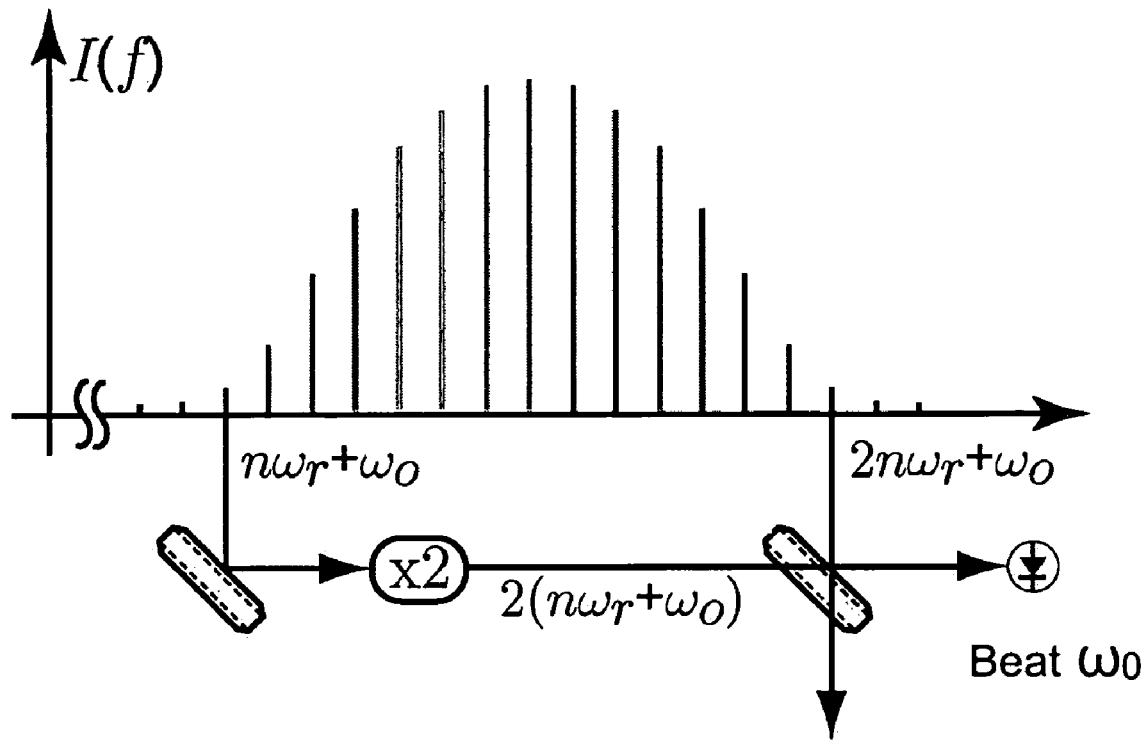
FIG. 2: a graphic illustration of a spectrum which covers an entire optical octave.

FIG. 2 shows that a spectrum which covers an entire optical octave which contains two modes with the mode number n and 2n. If the mode with the mode number n has its frequency doubled and is made to beat with the mode 2n, then according to equation 2 the desired frequency is obtained $\omega_o=2(n\omega_r+\omega_o)-(2n\omega_r+\omega_o)$.

Figure 3:
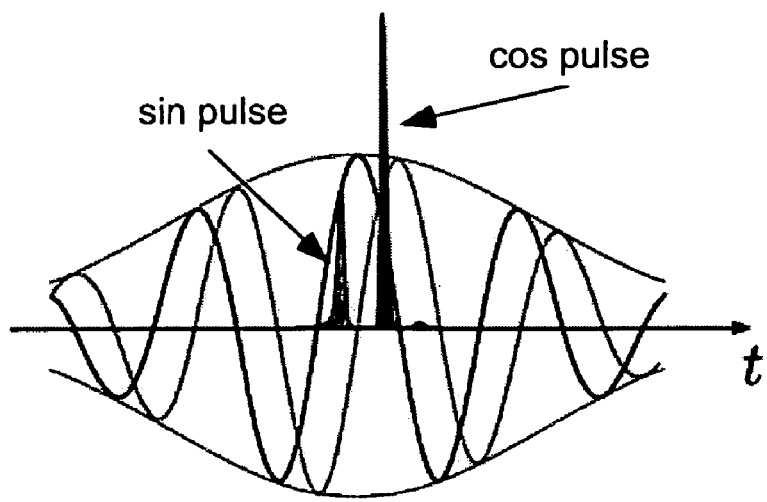
FIG. 3: a graphic illustration of a calculated intensity at 3.2 nm.

FIG. 3 illustrates the calculated intensity at 3.2 nm and the generated intensity in the case of a sine and cosine pulse. For the cosine pulse, the electric field reaches its maximum below the envelope.

Figure 5:
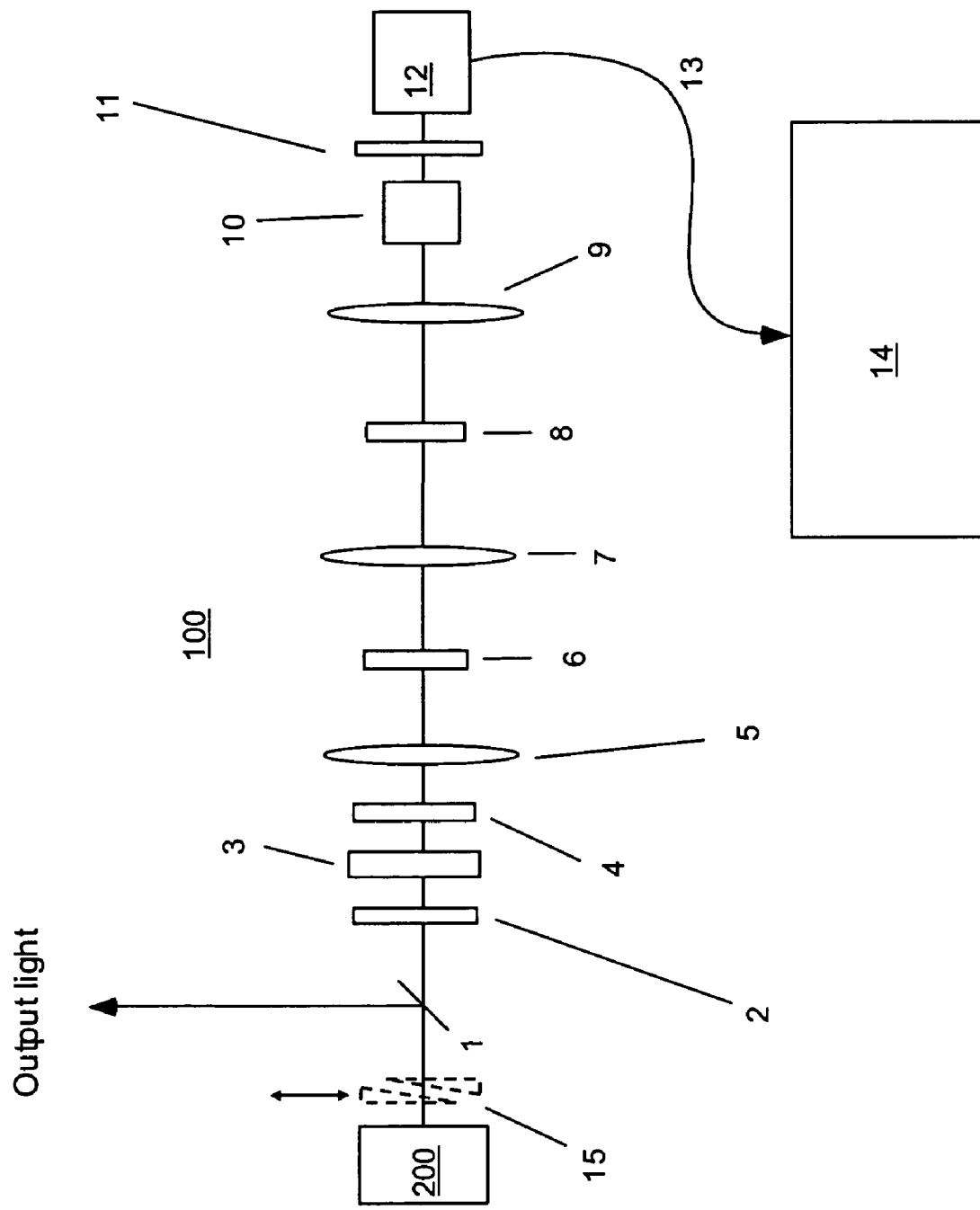
FIG. 5: an embodiment of an optical structure according to the invention.

The mode of operation of the optical structure according to the invention as shown in FIG. 5, in particular of the improved interferometer, will be described below. Pulsed light from a pulse source 200 (for example from a laser source and/or an amplifier system) impinges on a beam splitter 1. Part of the light is output for further use and part of the light, for example 1%, is fed into the interferometer 100. Firstly, the intensity of the light can be adjusted, namely by means of components, which are preferably provided and which comprise an adjustable grey filter 3 and/or an iris diaphragm 2,3 which can be closed to a greater or lesser extent as necessary. The polarization of the impinging light can be adjusted by means of a wave plate 4 (800 nm half-wave plate). The light is then focused by an optic 5 (lens) into a crystal 6 in order to generate white light. The crystal 6 serves as a broadening device. The crystal 6 may consist for example of sapphire or quartz glass and has a thickness of between 0.5 and 3 mm. In particular, light which covers an optical octave (for example from around 500 nm to 1 µm, white light) is generated here. This light is imaged through a further optic 7 (lens) into a crystal 8 for the purpose of frequency multiplication (in particular, generation of the 2nd harmonic of the fundamental wave, SHG, second harmonic generation). The optic 7 serves to recollimate and focus the white light. The focal length of this imaging lens 7 is for example within the range from 10 to 100 mm; it may also be an achromatic lens or a lens system.

In the prior art, the process is carried out using curved mirrors (see above). The reason for this can be seen in the management of dispersion. Since the curved mirrors do not exhibit (if they are coated with metal) or exhibit only very little of group velocity dispersion, the frequency of the interference bands is not changed at said mirrors. The advantage of the arrangement according to the invention here, on the other hand, lies in the fact that the band frequency can be adjusted via the lens thickness, thereby omitting the problem concerning astigmatism during imaging and providing a greatly simplified "in line" optical structure.

The SHG crystal 8 serves as a frequency multiplier device. It may be either a conventional volume crystal or a periodically poled crystal, for example consisting of lithium niobate or KTP. Its length is in the range from 0.5 to 5 mm.

The output light is again collimated by a further lens 9 and is coupled into a glass fiber by means of a suitable optic 12. Before being coupled into an optical fiber 13 (for example a glass fiber), an adjustable (rotatable) polarizer 10 is provided for setting the correct polarization mix between the fundamental wave and the 2nd harmonic (only necessary in the case of a volume crystal). A bandpass filter 11 for green or blue light may advantageously be provided in order to prevent saturation of the spectrometer 14.

Figure 6:
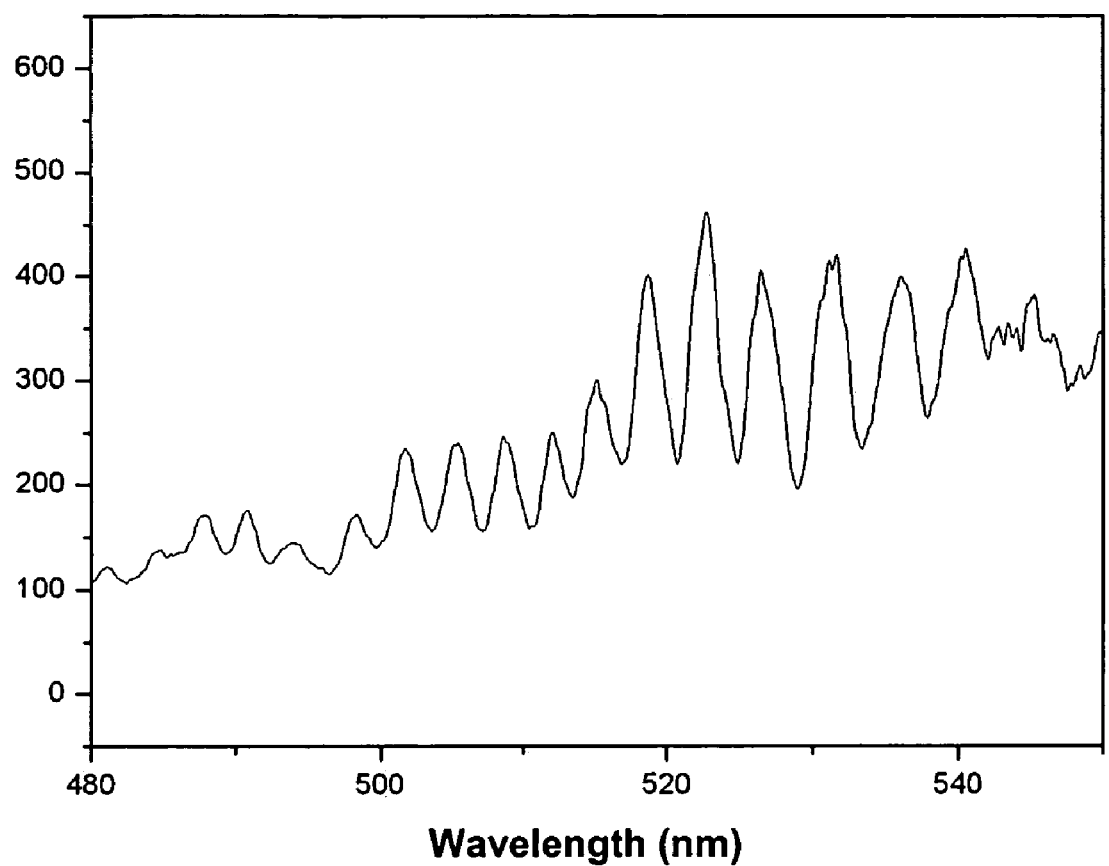
FIG. 6: interference patterns, recorded using the spectrometer shown in FIG. 5.

The light coupled into the fiber 13 is finally analyzed in the spectrometer 14. The typical interference bands are observed, as shown in FIG. 6. The spectrometer is a commercially available spectrometer comprising a grating and a CCD line camera with for example approximately 2000 or 4000 pixels and a resolution of 0.1 to 5 nm.

The interference bands thus detected are then used to keep the offset frequency constant. To this end, the band frequency is evaluated by means of Fourier transformation and the associated phase is calculated. An error signal for a PID (Proportional Integral Differential) controller is in turn derived therefrom, as known from control engineering.

Optionally, at least one wedge 15 (drawn with dashed line) can be provided with the embodiment of FIG. 5. The at least one wedge 15 can be used for adjusting the phace by shifting the wedge. Preferably, a double wedge (wedge pair) is provided in order to avoid a beam shift by moving the wedge. Preferably, the at least one wedge 15 is positioned after the laser-amplifier-combination 200.

Figure 4:
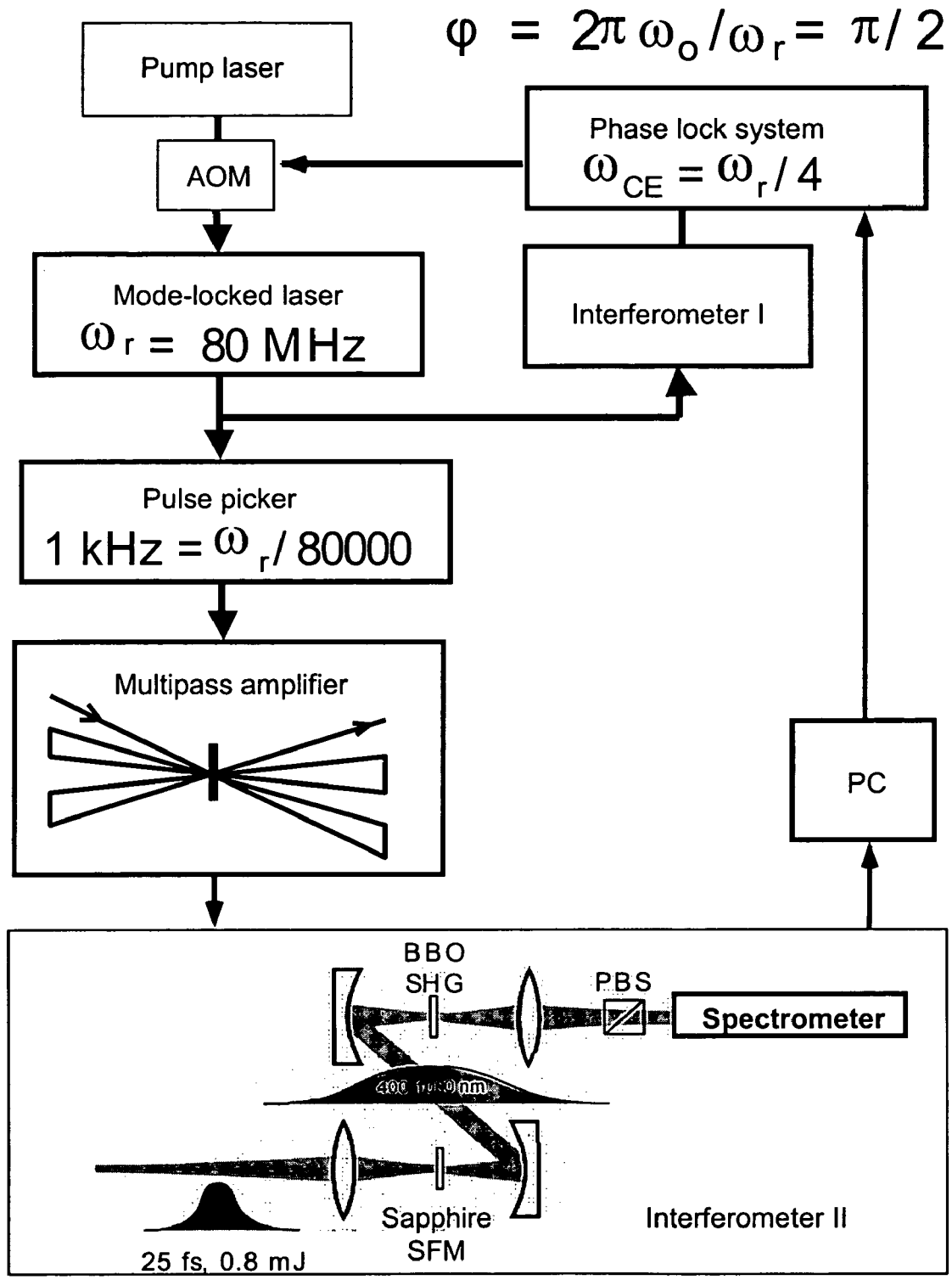
FIG. 4: a structure of a conventional phase-stabilized system for generating a high harmonic using an amplifier.

An analogue voltage signal is generated as the control signal by means of a device for generating a control signal (in particular a digital/analogue converter), and this signal is added to the input offset of the PI controller of the fast branch. Further details concerning control of the pulse source on the basis of the control signal will preferably be embodied as described above with reference to FIG. 4 or in the operating instructions for the XPS 800 apparatus from MenloSystems GmbH, the contents of which are hereby introduced by way of reference into the present description. In this way, the phase between the envelope and the electric field can be kept constant.

The features of the invention which are disclosed in the above description, the drawings and the claims may be important both individually and in combination with one another for implementing the invention in its various embodiments.

The invention claimed is:

1. Phase stabilization device for pulses of electromagnetic radiation, which comprises:
   an optical structure containing
   a broadening device for broadening a frequency spectrum of pulses of electromagnetic radiation,
   a frequency multiplier device for multiplying at least one frequency component of the broadened pulses,
   a focusing lens optic, which is arranged between the broadening device and the frequency multiplier device and which can be used to focus the broadened pulses into the frequency multiplier device, and
   a spectrometer detecting interference patterns in the light output of the frequency multiplier device, and
   a device for generating a control signal from the interference patterns.

2. Laser device, which comprises:
   a pulse source generating pulses of electromagnetic radiation, and
   the phase stabilization device according to claim 1, wherein
   the device for generating a control signal forms part of a control loop which can be used to control the pulse source.

3. Phase stabilization device according to claim 1, which is adapted for determining and stabilizing the relative carrier-envelop phase of short pulses.

4. Phase stabilization device according to claim 1, in which no mirror optic is provided on the optical path between the broadening device and the frequency multiplier device.

5. Optical method for carrier-envelope-phase stabilization of pulses of electromagnetic radiation, comprising the steps:
   broadening of a frequency spectrum of pulses of electromagnetic radiation in a broadening device, and
   transferring the broadened pulses of electromagnetic radiation by means of a focusing lens optic from the broadening device to a frequency multiplier device,
   detecting interference patterns in the light output of the frequency multiplier device using a spectrometer, and
   generating a control signal from the interference patterns.

6. Optical method according to claim 5, wherein
the focusing lens optic is arranged between the broadening device and the frequency multiplier device,
the step of transferring the pulses comprises focusing the pulses into the frequency multiplier device using the focusing lens optic, and
the optical method comprises the further step of multiplying at least one frequency component of the pulses using the frequency multiplier device.

* * * * *